F. A. HERWEHE.
ELECTRICAL GENERATING SYSTEM.
APPLICATION FILED SEPT. 28, 1914.
1,274,545.
Patented Aug. 6, 1918.
3 SHEETS—SHEET 1.
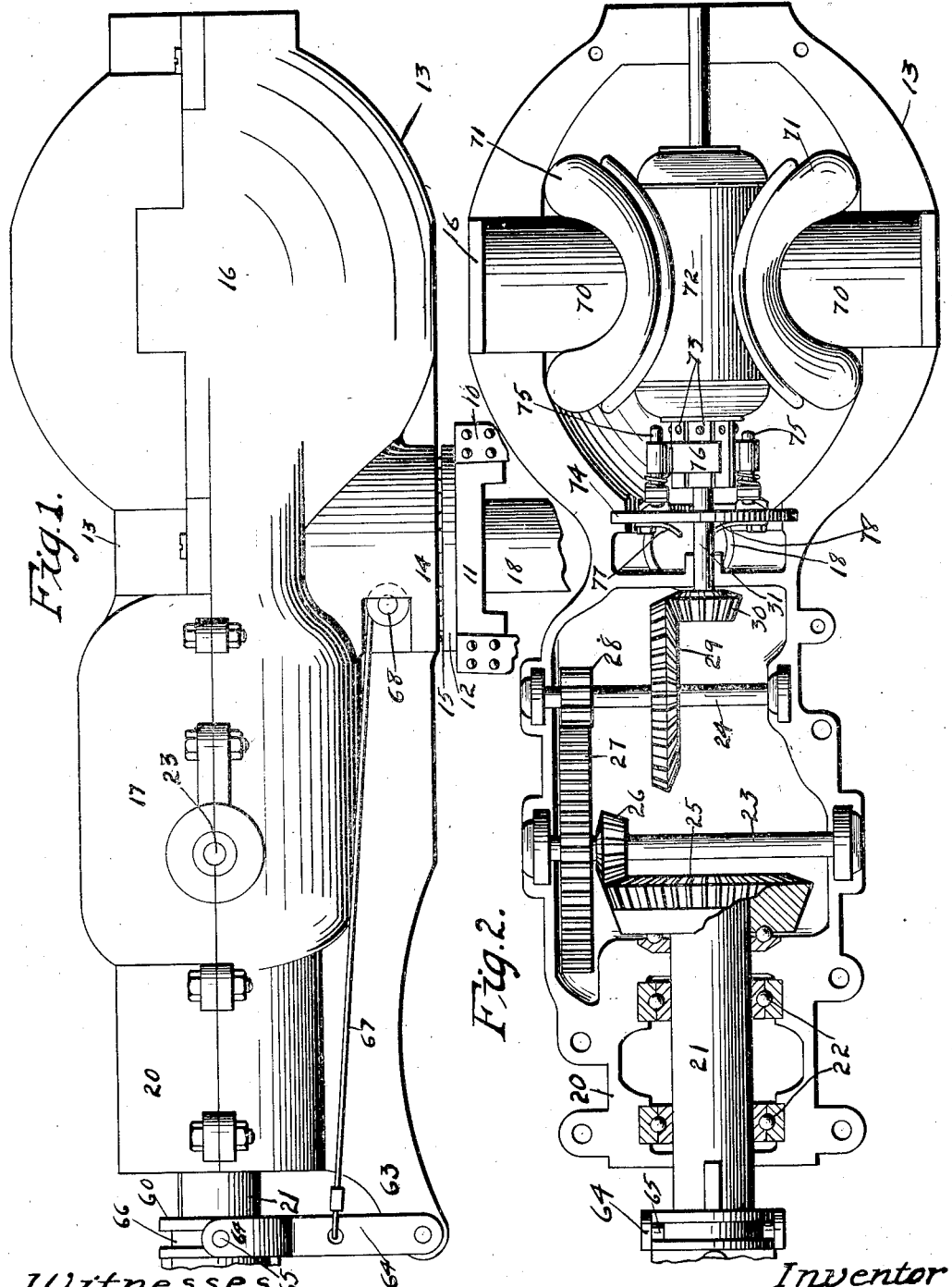
Witnesses
Inventor
Frederick A. Herwehe
By Owrig & Bair
Attys

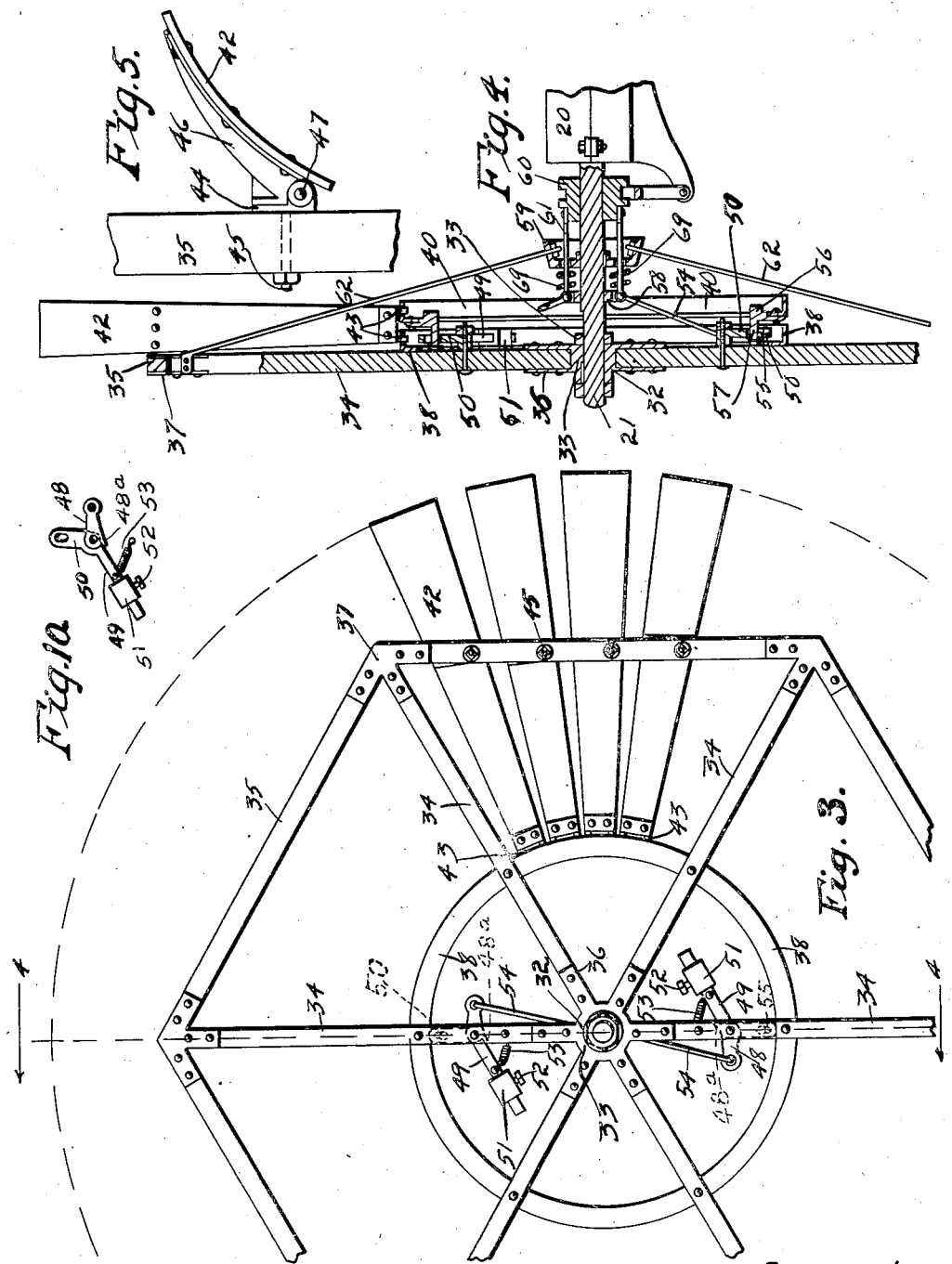

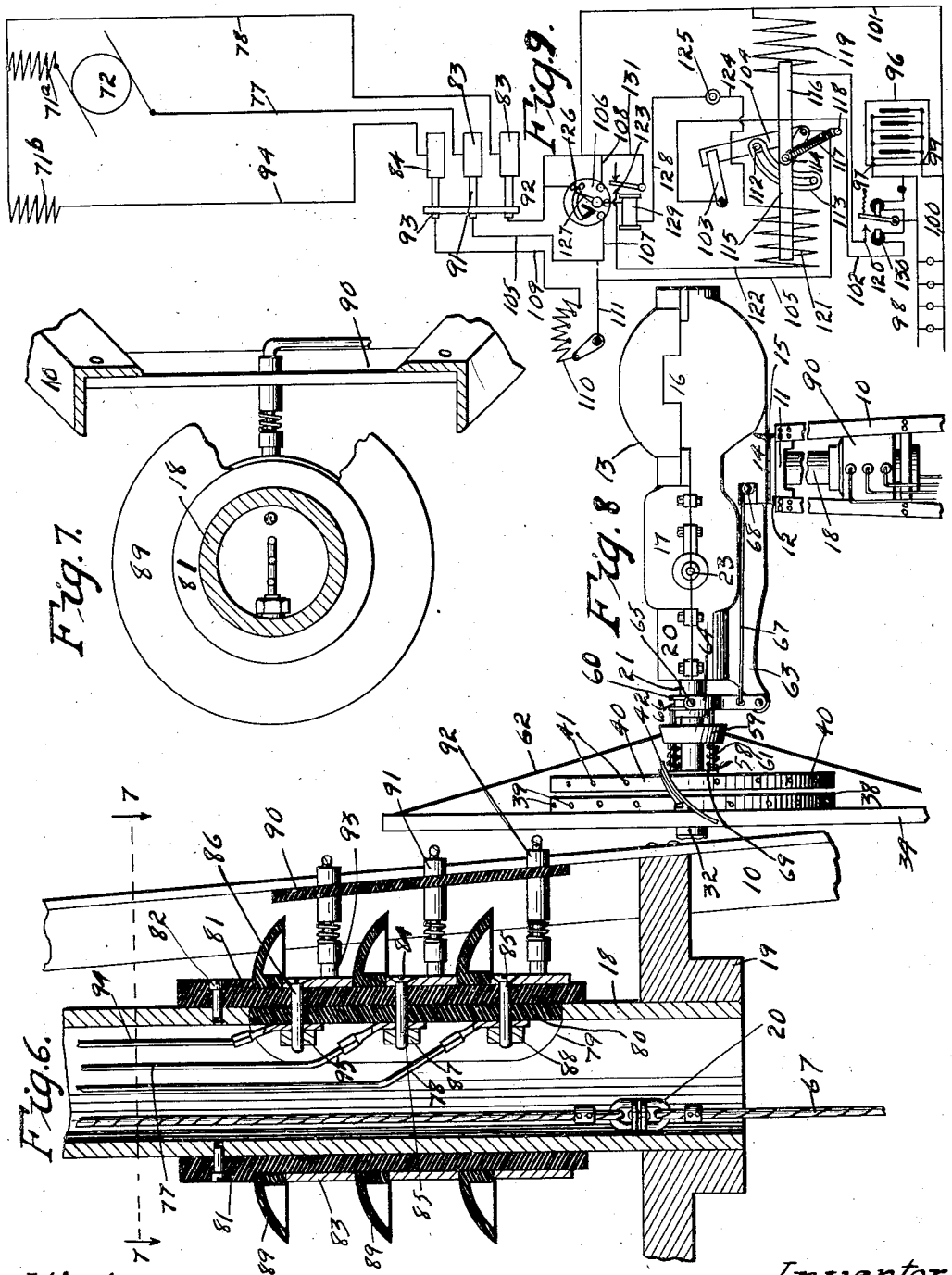

UNITED STATES PATENT OFFICE.

FREDERICK ALBERT HERWEHE, OF MONROE, IOWA.

ELECTRICAL GENERATING SYSTEM.

1,274,545.   Specification of Letters Patent.   Patented Aug. 6, 1918.

Application filed September 28, 1914. Serial No. 863,998.

*To all whom it may concern:*

Be it known that I, FREDERICK A. HERWEHE, a citizen of the United States, and resident of Monroe, in the county of Jasper and State of Iowa, have invented a certain new and useful Electrical Generating System, of which the following is a specification.

The object of my invention is to provide an aero-turbine of simple, durable and inexpensive construction.

More particularly, it is my object to provide a device of the general class mentioned in which a wind wheel and a dynamo are mounted upon a suitable tower or the like, and in which the dynamo is adapted to rotate or swing with the wheel and in which the ordinary wind vane is dispensed with.

Still a further object is to provide such a device in which the wheel is provided with a plurality of vanes capable of certain pivotal movement, whereby a greater or less area of resistance may be presented to the wind.

Still a further object is to provide in such a machine a wind wheel provided with an automatic governor, whereby the vanes are turned to present less angle of resistance to the wind whenever the wheel rotates at a certain predetermined maximum speed.

A further object is to provide in such a device means whereby the electricity generated may be transmitted to the ground below by suitable conductors which will not be interfered with by the fact that the wind wheel and the dynamo rotate with relation to the tower.

In general, it is my purpose to provide a dynamo operated from a wind wheel or a tower or the like, the parts being so arranged and constructed that the circuit through the dynamo will be shut off when the wheel travels below a certain predetermined speed, and also so arranged that the wheel will be prevented by an automatic governor from traveling above a certain predetermined maximum speed, and to provide also in such a device a means for manually controlling the wheel.

My invention consists in certain details, in the construction, combination and arrangement of the various parts of the device, whereby the objects contemplated are attained, as hereinafter more fully set forth, pointed out in my claims, and illustrated in the accompanying drawings, in which:

Figure 1 shows a side elevation of a dynamo, showing the method whereby it is mounted on the tower.

Fig. 2 shows a top or plan view of the dynamo, with the upper portion of the casing therefor removed.

Fig. 3 shows a front elevation of a portion of the wind wheel.

Fig. 4 shows a detail, sectional view, taken on the line 4—4 of Fig. 3.

Fig. 5 shows a detail view of one of the vanes of the wind wheel, taken from the outer end thereof.

Fig. 6 shows a vertical, central, sectional view through the collecting devices mounted on the tower for transmitting the current from the rotating dynamo to the wires below.

Fig. 7 shows a horizontal, sectional view, taken on the line 7—7 of Fig. 6.

Fig. 8 shows a side elevation of the upper portion of the tower with the dynamo and wind wheel installed thereon, and Fig. 9 shows a diagrammatic view, illustrating the arrangements of the circuits.

Fig. 10 shows a detail view of the governor.

In the accompanying drawings I have used the reference numeral 10 to indicate generally a tower which may be of any suitable construction, such as that of an ordinary wind mill tower. Mounted at the upper end of the tower 10 is a suitable platform 11, formed on which is a ball race 12. Above the platform 11 is the dynamo provided with a ball race 14. Between the races 12 and 14 are the balls 15, whereby the dynamo 13 is mounted to rotate with relation to the tower 10. The dynamo 13, as indicated in Fig. 9, is of a compounding wound type. The windings are within the portion 16 of the dynamo casings. Within the portion 17 of the casings are gearing devices hereinafter to be described.

Between the casing members 17 and 16 there is formed a downwardly extending tube 18, which extends downwardly through the platform 11, as shown in Figs. 1 and 8. The lower end of the tube 18 is mounted in a suitable bearing 19 on the frame of the tower 10. The gearing devices hereinafter to be described, the dynamo bearing and the wind wheel, which will be described, are all so arranged that they are substantially balanced above the tower. In other words, the gearing devices and wind wheel are so arranged with relation to the dynamo that the weight of the dynamo balances the gearing and wind wheel to permit the freest possible rotation of the dynamo and wind wheel with relation to the tower.

Formed on the end of the casing member 17, farthest away from the casing member 16, is a casing 20 in which is mounted a shaft 21 in suitable ball bearings 22. Mounted within the casing portion 17 are two transverse shafts 23 and 24. On the shaft 21 is a beveled gear 25 in mesh with a small beveled gear 26 on the shaft 23. On the shaft 23 is a pinion 27 in mesh with a smaller pinion 28 on the shaft 24. On the shaft 24 is a beveled gear 29 in mesh with the beveled gear 30 on the armature shaft 31.

It will be seen from the relative sizes of the gears hereinbefore referred to that the comparatively slow speed of the wind wheel which operates the shaft 21, as hereinafter described, will impart a comparatively faster rotation to the armature shaft. Mounted on the outer end of the shaft 21 is a hub 32 which is keyed to said shaft. On each side of the hub 32 on the shaft 21 is a retaining collar 33. Extending radially outwardly from the hub 32 are members 34 which, for convenience, I shall call spokes.

It will be understood that the frame of the wind wheel which is now being described may be made of wood or suitable metal construction, as may be desired. The ends of the spokes 34 are connected by suitable frame members 35, forming where six spokes are used a hexagon, as partially shown in Fig. 3.

The hub 32 is preferably provided with a plurality of pairs of radially outwardly extending arms 36. The inner end of each spoke 34 is received between a pair of said arms 36. The outer ends of the spokes 34 may be secured to the ends of the adjacent members 35 by means of clamping plates 37. Secured to the spokes 34 at points spaced apart from their inner ends is an annular ring 38, made of angle bar, as shown in Fig. 4. One flange of the annular angle bar 38 is secured to the spokes 34 and the other flange extends away from said spokes at right angles thereto. The latter flange is provided with a plurality of openings 39. Arranged adjacent to and spaced from the annular ring 38 on the side thereof away from the spokes 34 is a similar annular ring 40, made of angle bar having in one of its flanges openings 41 similar to the openings 39. The vanes 42 of the wind wheel now being described are provided at their inner ends with pairs of inwardly extending lugs 43. One of said lugs 43 on each vane is rotatably received within one of the openings 39 and the other lug on the same vane is rotatably received within one of the openings 41, as illustrated in Fig. 4. The vanes 42 are pivotally mounted with relation to the members 35 by means of brackets 44 secured to the members 35 by bolts 45. On each of the vanes 42 is a bracket 46 pivoted to the bracket 44 by means of a bolt 47 to permit tilting or pivotal movement of the vanes 42 with relation to the members 35 for varying the area or angle of resistance presented to the wind by the vanes.

It will readily be seen that by rotating the annular ring 40, the vanes 42 may be tilted to vary their angle of resistance. For automatically controlling the angle of resistance of the vanes 42, the following means have been provided.

Pivoted to two opposite members 34 are governor devices comprising pivoted arms 48 and 49. Preferably formed integral with the arm 49 is an arm 50, shown by the dotted lines in Fig. 3, and extending outwardly substantially parallel with the members 34. Slidably mounted on the arms 49 are weights 51 which may be secured in various positions of their movement by means of set screws 52. The weighted arms 49 are yieldingly held inwardly by means of springs 53. The arms 48 are pivotally connected with links 54 which extend radially inwardly and at their inner ends are pivoted to a collar 58, slidably mounted on the shaft 21. In the arms 50 are slots 55, as shown by the dotted lines in Fig. 3, and as shown in Fig. 4, which are radially elongated. Mounted on the annular member 40 are members 56 having laterally extending portions 57 which are received within the slots 55. The parts just described are so constructed and arranged that when the collar 58 is moved longitudinally on the shaft 21, the arms 50 will be swung around their pivotal point as a center, thereby tending to rotate the annular member 40 and to change the angle of resistance of the vanes 42. Fixed to the shaft 21 between the wind wheel and the casing member 20 is a collar 59. Slidably mounted on the shaft 21, between the collar 59 and the casing members 20, is a collar 60. The collars 58 and 60 are rigidly connected with each other by means of rods 61, slidably extended through the collar 59, as shown in Fig. 4.

Secured to the collar 59 and extending outwardly therefrom toward the members 35 are brace rods 62, whereby the collar 59 and the wheel are rigidly connected together and braced.

The parts hereinbefore described are so constructed and arranged that when the wheel begins to travel beyond a certain predetermined maximum speed, the weights 51 tend to fly outwardly. The arms 50, connected with the arms 49, then swing around the center of the wheel, thereby rotating the annular member 40 in such a way as to present the edges of the vanes 42 to the wind and to lessen the angle of resistance of said vanes 42. Formed on the gear casing of the motor is an arm or bracket 63, to which is pivoted an outwardly extending bifurcated arm 64, in the upper ends of which are mounted pins 65 which extend into an annular groove 66, in the collar 60. A flexible device 67 is pivoted to the arm 64 and extended over a pulley 68 in the member 14, and then extended downwardly through the supporting tower. Mounted on the rod 61, between the collar 58 and the collar 59, are coil springs 69 which tend to hold the collar 58 at the extreme limit of its movement toward the wheel and thereby to hold the vanes 42 in position to expose the greatest surface to the wind. By pulling the flexible device 67 downwardly, the springs 69 may be compressed and the vanes moved edgewise to the wind.

It will be understood from the foregoing description that power is transmitted from the wind wheel to the shaft 31.

The casing 16 which carries the shaft 31 is designed to form the portion of the electric generator in which the pole pieces 70 are secured. Each of the pole pieces 70 is provided with a compound winding 71 which is of the ordinary construction. Secured to the shaft 31 midway between the inner end of the pole pieces 70 is an armature 72, having a commutator 73. Rotatably mounted within the casing 16, adjacent to one end of the armature 72 is an annular ring 74, designed to carry the brush holders 75, each of the brush holders 75 being provided with a brush 76.

Thus it will be seen that by a slight rotation of the annular ring 74, the brushes 76 may be properly adjusted relative to the commutator 73. Each of the brush holders 75 is provided with wires 77 and 78, which extend downwardly through the downwardly extending tube 18. As pointed out in my objects it is my purpose to provide a storage battery at the base of the tower placed in a suitable building for that purpose and also new and improved electrical controlling devices, a diagrammatic view of which is illustrated in Fig. 9 of the drawings, the said devices being connected with the electric generator by means of the downwardly extending wires 77 and 78.

It will be seen that if the said wires were extended downwardly through the said tube and connected to a stationary mechanism beneath, the said wires would become twisted as the tube 18 is rotated within its bearings when the turbine is in operation. To overcome this difficulty I have provided current collecting devices secured to the lower end of the tube 18, the tube 18 being provided near its lower end with an oblong opening 79 in which a block of insulation 80 is secured.

Secured to the lower end of the tube 18 and adjacent to the block 80 I have provided a sleeve 81, composed of any suitable insulating material, the said sleeve being secured to the tube 18 by means of the screws 82. Secured around the sleeve 81 I have provided three annular conductors 83, which are spaced slightly apart from each other. These conductors are secured in position by means of the screws 84, 85 and 86, which are extended inwardly through the block 80. The lower ends of the wires 77 and 78 are secured to the screws 84 and 85 respectively by means of the nuts 87 and 88. Secured around the sleeve 81 and adjacent to the top edge of each of the annular conductors 83 is an inverted cup shaped insulating device 89, designed to form a weather shed for said conductors and also to furnish insulating means between said conductors. Secured to two of the upright members 10 is a horizontal insulating bar 90 which lies adjacent to the said conductors. Secured to the bar 90 is a plurality of spring actuated conducting members 91, 92 and 93, one of which is designed to coact with each of the conductors 83.

Thus it will be seen that the tube 18 may be free to rotate and with it a number of conducting wires that current may be conducted from each of the said wires to the said spring actuated conductors.

Referring to the diagram in Fig. 9, I have indicated the series wind of the generator by the reference numeral $71^a$ and the shunt winding by means of the reference numeral $71^b$. The shunt winding $71^b$ is provided with a conductor 94, the lower end of which extends downwardly through the tube 18 and is connected to the post 86 by means of the nut 95. The storage battery is indicated by the numeral 96 and has the terminal 97 connected with an electric light line 98 and the other terminal 99 connected with a similar line 100. Connected to the terminal 99 I have provided a conductor 101 which has its opposite end connected to the spring actuated conductor 92. The terminal 97 is provided with a conductor wire 102, the opposite end of which is connected to the switch block 103. The switch block 103 is designed to coact with the switch arm 104, which has secured to it the conductor 105, the opposite end of which is connected with the spring actuated conductor 91.

Thus it will be seen that I have provided a circuit between the generator 72 and the storage battery 96, which I shall call the main circuit, when the switch 104 is in the position illustrated. I have provided between the main circuit, wires 105 and 101, a volt meter 106 connected therewith by means of the conductors 107 and 108. Secured to the spring actuated conductor 93 is a conductor 109, one end of which is connected to a rheostat 110, said rheostat being connected to the conductor 105 by means of the conductor 111.

Thus it will be seen that I have provided means for varying the resistance in the shunt wind coil 71ᵇ, and thereby manual means for controlling the voltage output of the generator 72. In devices of this kind, it is essential to provide means for automatically opening the main circuit when the electric generator has ceased to operate. For automatically accomplishing this result, I have provided the following devices:

The switch arm 104 is provided with a pin 112. Pivotally secured to the pivotal point of said switch is a slotted sector 113, the said sector being provided with a pin 114, the said pin 114 being designed to carry two solenoid core members 115 and 116. Secured to the outer end of the pin 114 is a contractile coil spring 117, the lower end of which is secured to a pivot 118, lying in a vertical line to the pivot of said switch member. Surrounding the outer end of the core member 116, I have provided a solenoid 119, one end of which is connected with the wire 101, and the opposite end of which terminates in a contact point 120. The opposite core member 115 is provided with a solenoid 121, one end of which is provided with a conductor 122, the end of which is provided with a contact member 123.

The opposite end of the solenoid 121 is provided with a conductor 124, which is connected to a contact point 125, the contact point 125 being designed to coact with the switch 104, when in one of its positions. The volt meter 106 is provided with a contact 126, which is connected to the main circuit wire 101. The contact 126 is designed to be engaged by the indicating finger 127. The finger 127 is provided with a conductor 128, connected with the contact point 125, in which is a relay 129. The conductor 102 is provided with a polarized relay 130.

Assuming that the generator 72 is being operated at normal speed and the battery 96 is being charged, the switch 104 will be in contact with the block 103, as illustrated. If the generator 72 should slow down or become stopped, a reverse current will be set up in the main circuit, thereby causing the polarized relay to make contact with the point 120, thereby establishing a circuit through the solenoid 119 and the contact point 120. This would cause the core 116 to be moved into the solenoid 119, and with it the sector 113, which would cause the spring 117 to pass the pivotal center of the switch 104 and the pin 112 to be engaged by the end of the slot in said sector. This would throw the switch 104 in contact with the pin 125, thereby disconnecting the main circuit through said switch.

When the generator 72 has ceased to operate, the finger 127 will disengage the contact 126. If the generator should again establish its normal speed, the finger 127 would engage the contact 126 and a circuit would be established through the relay 129 and the conductor 128 and the switch member 104 to the main circuit 105, thereby causing the armature of the relay 129 to engage the contact 123, establishing a circuit through the conductor 131 and the conductor 122, the solenoid 121 and the circuit 124 to the switch 104. This would cause the core member 115 to move into the solenoid 121 and with it the switch 104 to again establish the main circuit.

Thus it will be seen that I have provided a simple, durable and inexpensive device for automatically controlling the charging of the storage battery.

The advantages of my improved generating system may be largely seen from the foregoing description. It will be seen that should the wind wheel operate at less than the proper speed to cause the generator to charge the battery, the mechanism hereinbefore described will break the circuit between the generator and battery. When, however, the wheel travels at a sufficient rate of speed to enable the current generated to overcome the current from the battery, then the switch will be automatically operated to close the main circuit and the battery will be charged.

It will readily be seen that when the battery is charged up to a certain point it will take a very rapid speed of the wind wheel to keep the main circuit closed, and as a matter of fact, in practice the construction shown furnishes means for breaking the circuit, which on account of the automatic governor prevents the wheel from traveling at greater than a predetermined maximum speed.

The construction of the means for mounting the generator is such that the heaviest weight is imposed almost over the center of the tower. The generator turns with the wheel, and thereby makes it possible to dispense with the ordinary weather vane commonly used with the wind wheel.

The use of the collectors on the cylinder 18 makes it possible to continue the operation of the device without twisting the conducting wires. In this connection it may be noted that the flexible device 67 is provided with a swivel 200, whereby one portion of said flexible device may be rotated with the other portions thereof.

It will be understood that numerous changes may be made in the details of the construction of my improved aero-turbine, without departing from its essential features, and it is my intent to cover by this application any such changes which may be included within the scope of my claims.

I claim as my invention:

1. In a device of the class described, a generator rotatably mounted and having series and shunt windings, a rheostat in the circuit of the shunt winding, a storage battery in said circuit with said generator, a volt meter in parallel with said storage battery, a switch in said circuit, a polarized relay in said circuit, means controlled through said volt meter for closing said switch, and means actuated through said polarized relay for opening said switch, and electric circuit on said storage battery.

2. In a device of the class described, a generator having series and shunt windings, a rheostat in the circuit of said shunt winding, a storage battery in circuit with the said generator, a volt meter in parallel with said storage battery, a switch in said circuit, a spring actuated switch control, a polarized relay in said circuit, means controlled through said volt meter for operating said spring actuated switch control to close said switch, and means actuated through said polarized relay for operating said actuated switch control to open said switch.

Des Moines, Iowa, September 8, 1914.

FREDERICK ALBERT HERWEHE.

Witnesses:
D. E. FOSTER,
ADAM HERWEHE.